UNITED STATES PATENT OFFICE.

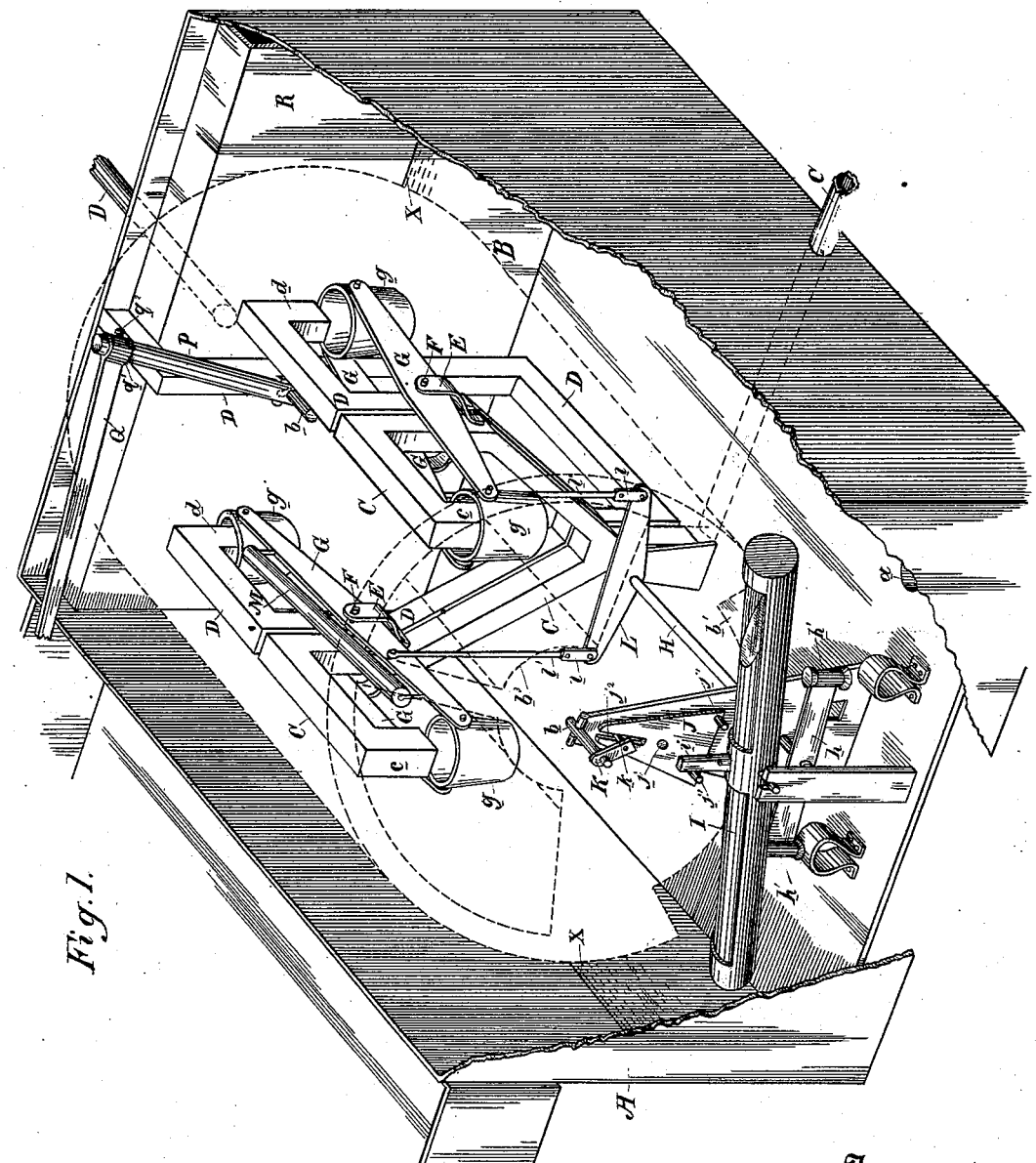

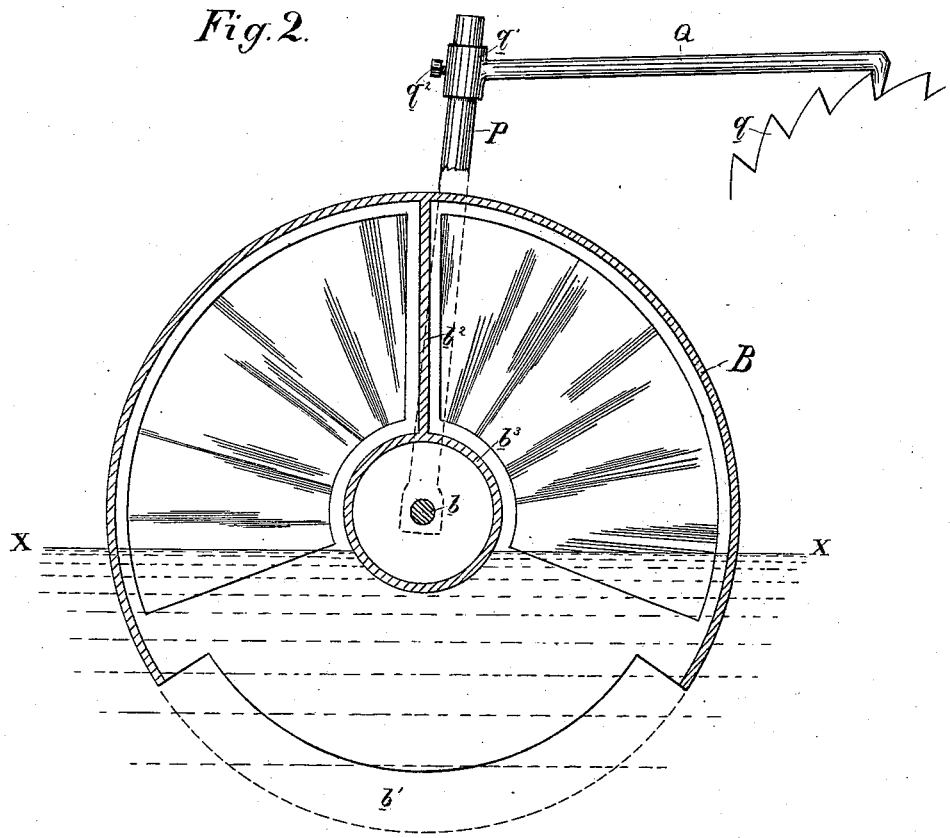

ANSON F. FISHER, OF CHICO, CALIFORNIA, ASSIGNOR OF TWO-THIRDS TO ALLEN HENRY AND A. M. BARLEY, OF SAME PLACE.

OSCILLATING GAS-METER.

SPECIFICATION forming part of Letters Patent No. 349,489, dated September 21, 1886.

Application filed February 27, 1886. Serial No. 193,530. (No model.)

*To all whom it may concern:*

Be it known that I, ANSON F. FISHER, of Chico, in the county of Butte and State of California, have invented an Improvement in Gas-Meters; and I hereby declare the following to be a full, clear, and exact description thereof.

My invention relates to that class of gas-meters in which an oscillating cylinder or drum is operated by the inlet and exhaust of the gas passing through it; and my invention consists in the novel cylinder or drum in connection with the water-seal in which it operates; in the peculiar valve mechanism operated by the cylinder, whereby the gas is admitted and exhausted, and in details of construction, all of which I shall hereinafter fully describe by reference to the accompanying drawings, in which—

Figure 1 is a perspective view of my gas-meter, the outer casing being broken away and the cylinder shown in dotted lines. Fig. 2 is a cross-section of the cylinder.

The object of my invention is to provide a simple, accurate, and effective gas-meter.

A is a casing or shell, in which is mounted and adapted to oscillate the drum or cylinder B, which is journaled therein by means of short gudgeons or shafts $b$ projecting from its ends. The cylinder is not a complete one, being provided with an opening, $b'$, in its bottom, and it is divided into two equal compartments by a diaphragm or partition, $b^2$, extending across its upper portion, Fig. 2. It has also a large cylindrical core, $b^3$, and one end of it may be glazed in order to observe its interior, Fig. 2.

C is the inlet-pipe for the gas, which passes through the bottom of the shell or casing, and after entering the drum or cylinder through its open bottom is divided into two branches, one of which enters one compartment of the drum and the other the other compartment, both terminating in downwardly-projecting short pipes $c$, which are open and form the ports.

D is the exhaust-pipe to the burner. It leads in from any suitable direction to the casing A, and is similarly arranged in position and construction to the inlet-pipe C, being provided with the downwardly-opening port-pipes $d$, one in one compartment and the other in the other compartment of the drum, as shown.

Journaled in brackets E, supported by the branches of the inlet and exhaust pipes, are short shafts F, upon which are secured by their centers the levers G, in the ends of which are suspended the thimbles or cups $g$, which are to contain mercury or other liquid, and which by their movement open and close the downwardly-opening ports $c$ $d$ by immersion in their liquid, or by freeing them therefrom, said thimbles or cups then forming the valves.

H is a shaft mounted horizontally near the bottom of the casing, and having on one end a cross-arm, $h$, provided on its ends with small buffers $h'$. Pivoted horizontally by its center is a tubular lever, I, which lies just above the cross-arm $h$ of the shaft H, and is adapted by its oscillation to come in contact with the buffers on said arm and alternately depress one end or the other, by which the shaft H is oscillated. This tubular lever is sealed tight, and contains some quicksilver, the purpose of which is to carry it over the center and operate the cross-arm $h$ and the valves independent of the further movement of the drum.

Pivoted on a horizontal pin, $j$, is a lever, J, the lower end of which is provided with two lugs, $j'$, which lie on each side of and alternately engage an upwardly-projecting arm, $i$, on the center of the tubular lever I. The upper end of the lever J is slotted at $j^2$, and with this slot engages an inwardly-projecting pin, $k$, on a short arm, K, extending downward from the gudgeon of the oscillating cylinder or drum B. The other end of the lever H is provided with a cross-lever, L, to the ends of which are pivoted links $l$, which are connected by rods $l'$ with the levers G above. Supported upon and parallel to these levers G may be tubes M, which contain some quicksilver, the movement of which, by the oscillation of the tubes, holds the levers and valves sufficiently stable in their positions before their reverse movement. Water is placed in the shell A, its level being shown by the line X X, and this water may be drawn off, when necessary, through the exit-pipe $a$ in the bottom of the casing.

The operation of my meter is as follows: The gas under pressure, being admitted through the inlet-pipe C, and finding one of its ports $c$ open, enters one compartment of the drum or cylinder, which is cut off from the other by the water seal. It therefore forces the drum over on its axis. This movement of the drum, through the arm K and levers J and I, causes the shaft H to oscillate, whereby, through the cross-lever L and rods l', the levers G are vibrated, thereby raising the valve g of the inlet-port in the first compartment and closing it, lowering the valve of the inlet-port in the second compartment and opening it, closing the exhaust-port d in the last-named compartment, and opening that in the first compartment. The motion is now reversed, the gas entering the second compartment and exhausting from the first, and the operation is repeated. The drum or cylinder is thus caused to oscillate, and it is this movement which I make use of to operate any suitable registering device. I have not deemed it necessary to show any such registering mechanism or its connections, with the exception of the arm P, extending upward from the gudgeon of the drum or cylinder and connected with a pawl, Q, the end of which engages a toothed wheel, q, which may be supposed to furnish the power to the registering mechanism.

The connection between the lever P and the pawl Q should preferably be an adjustable one—as by a small sleeve, q', and a set-screw, q²—whereby said pawl may be made to engage one or more teeth of the wheel, as may be desirable.

The exhaust-pipe to the burner may pass directly with its port, or it may, as I have here shown, be made to enter and communicate with a chamber, R, formed in the casing or shell A. The intervention of this chamber is for the purpose of providing, if necessary, for sufficient pressure to effect a steady exhaust of gas to the burner.

The object of the cylindrical core of the drum is to prevent undue friction with the water seal.

Having thus described my invention, what I claim as new, and desire to secure by Letters Patent, is—

1. In a gas-meter, the shell or casing A, having a water seal, in combination with the oscillating open-bottomed cylinder or drum B, having a partition dividing it into compartments, inlet and exhaust pipes entering said compartments, and having downwardly-opening ports c d, and thimbles or cup-valves controlling the ports of said pipes and operated by the movement of the drum, substantially as herein described.

2. In a gas-meter, the casing or shell A, having a water seal, in combination with the oscillating open-bottomed cylinder or drum B, mounted therein, and having compartments, as described, inlet and exhaust pipes having branches entering the compartments of said drum, and having downwardly-opening ports, valves containing fluids and controlling said ports, and mechanism, substantially as described, between the pivotal shaft of the drum and said valves, whereby they are operated to cause the oscillation of the drum, substantially as herein described.

3. In a gas-meter, the shell or casing A, containing a water seal, and the drum or cylinder B, mounted therein and adapted to oscillate, said drum or cylinder being divided into compartments, in combination with the inlet and exhaust pipes C D, entering the cylinder, and provided with divergent branches having each a downwardly-opening port in each compartment of the cylinder or drum, the thimble or cup valves g, containing mercury or other liquid and controlling the ports, and connecting mechanism between said valves and the drum or cylinder, whereby the valves are operated and the cylinder oscillated, substantially as described.

4. In a gas-meter, the shell or casing A, containing a water seal, and the drum or cylinder B, mounted therein and adapted to oscillate, said drum or cylinder being divided into compartments, in combination with the inlet and exhaust pipes C D, entering the cylinder, and provided with the divergent branches having each a downwardly-opening port in each compartment of the drum or cylinder, the thimble or cup valves g, containing mercury or other liquid and controlling the ports, the pivoted levers G, by which said valves are suspended, the oscillating shaft H below, connections between said shaft and the levers, whereby the latter are vibrated, and connections between the shaft and the drum or cylinder by which said shaft is oscillated, substantially as described.

5. In a gas-meter, the shell or casing A, containing a water seal, and the oscillating drum or cylinder therein, and having compartments, as described, in combination with the inlet and exhaust pipes C D, connected with downwardly-opening ports c d in each compartment, the thimble or cup valves g, containing mercury or other liquid and controlling the ports, the pivoted levers G, suspending the valves, the oscillating shaft H, having cross-lever L, connected with levers G, and a cross-arm, h, on its other end, the pivoted lever I, actuating the cross-arm, the pivoted lever J, operating lever I, and the connection between the lever J and the pivotal shaft of the cylinder or drum, all arranged and adapted to operate substantially as herein described.

6. In a gas-meter, the shell or casing A, having a water seal, and the oscillating drum or cylinder B therein, and divided into compartments, in combination with the inlet and exhaust pipes C D, having a port in each compartment, the thimble-valves g, containing mercury or other liquid and controlling said ports, the levers G, by which the valves are operated, the shaft H, by which the levers are vibrated, the tubular pivoted lever I, containing some quicksilver and actuating the shaft H, and the connection between said tubular lever and the drum or cylinder by which it is vibrated, substantially as described.

7. In a gas-meter having an oscillating cylinder or drum operating in a water seal, and suitable inlet and exhaust ports, the thimble-valves g, containing mercury or other liquid and controlling the ports, in combination with the pivoted levers G, suspending the valves, the tubes M above the levers and containing some quicksilver, and the connections between said levers G and the drum or cylinder, whereby they are operated, substantially as herein described.

8. In a gas-meter, the shell or casing A, having a water seal and a chamber, R, in one side, in combination with the oscillating drum or cylinder B in the casing, an inlet-pipe having a port and controlling-valve, and the exhaust-pipe D, having a port and controlling-valve, said pipe communicating with the chamber R, substantially as described.

In witness whereof I have hereunto set my hand.

ANSON F. FISHER.

Witnesses:
S. H. NOURSE,
H. C. LEE.